United States Patent [19]

Shallenberger et al.

[11] Patent Number: 4,799,312
[45] Date of Patent: Jan. 24, 1989

[54] TOOL FOR REPLACING LOCKING SCREWS IN A NUCLEAR FUEL ASSEMBLY

[75] Inventors: John M. Shallenberger, Fox Chapel Borough; Stephen J. Ferlan, Wilkins Township, Allegheny County, both of Pa.

[73] Assignee: Westinghouse Electric Corp., Pittsburgh, Pa.

[21] Appl. No.: 79,208

[22] Filed: Jul. 29, 1987

Related U.S. Application Data

[60] Division of Ser. No. 870,584, Jun. 4, 1986, abandoned, which is a continuation-in-part of Ser. No. 762,733, Aug. 5, 1985, abandoned.

[51] Int. Cl.⁴ .............................................. B23D 19/00
[52] U.S. Cl. ........................................ 29/723; 29/244; 29/275; 72/479
[58] Field of Search ................. 29/723, 235, 244, 249, 29/270, 275, 281.4; 72/479, 976; 376/260, 261, 446

[56] References Cited

U.S. PATENT DOCUMENTS

| | | | |
|---|---|---|---|
| 2,999,407 | 9/1961 | Frangesco | 29/275 |
| 3,222,766 | 12/1965 | Camargo | 29/275 |
| 3,519,087 | 7/1970 | Santi | 29/275 |
| 3,677,060 | 7/1972 | Loquist | 72/476 |
| 3,800,391 | 4/1974 | Westbrook | 29/275 |
| 4,533,075 | 8/1985 | Hallock et al. | 29/275 |
| 4,630,463 | 12/1986 | Knowlton | 72/476 |
| 4,649,733 | 3/1987 | Gilmore | 29/275 |
| 4,667,388 | 5/1987 | Browning | 29/275 |
| 4,670,957 | 6/1987 | Wolford | 29/275 |

Primary Examiner—Howard N. Goldberg
Assistant Examiner—Irene Cuda

[57] ABSTRACT

A tool for straightening an arched pin into one of a pair of slots orthogonally defined in a screw head including an elongated rod-like member, means mounted on one end of the rod member for applying an axially directed force, an elongated sleeve mounting the rod-like member for reciprocal movement within the sleeve and having an end adapted to seat about the screw head, a tool handle mounted at one end of the sleeve adjacent the force applying means and a pin setting tool bit connected to an opposite end of the rod like member being indexible with one of the slots in the screw head and for delivering an impact force to the arched pin in the other screw head slot.

5 Claims, 9 Drawing Sheets

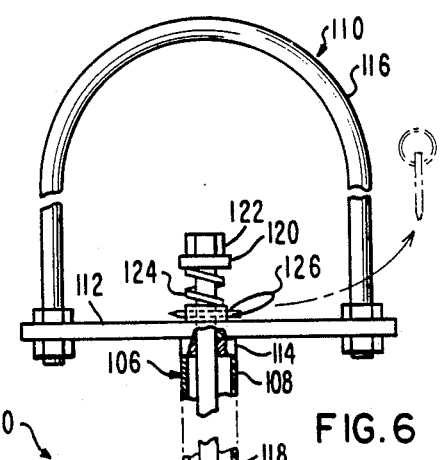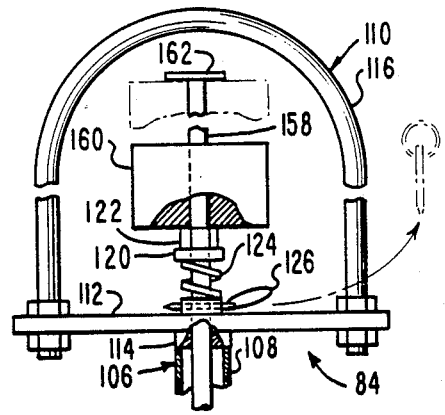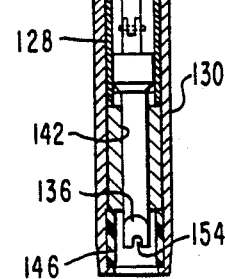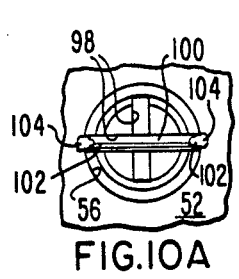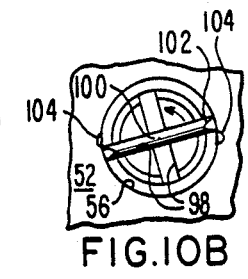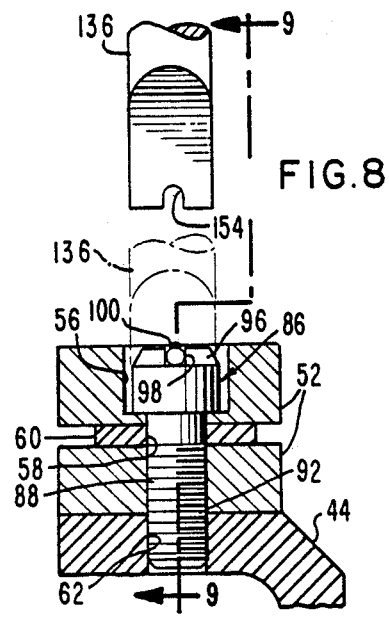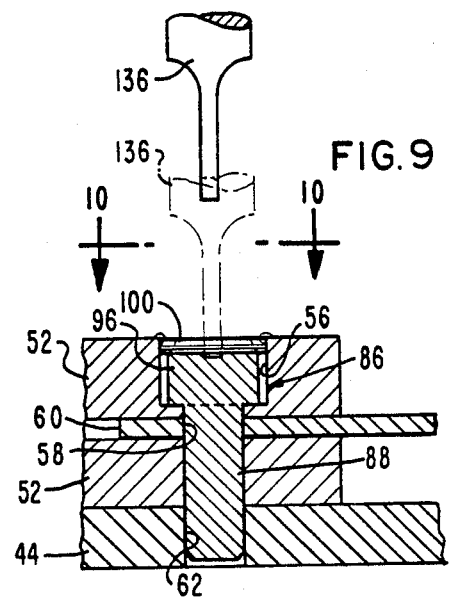

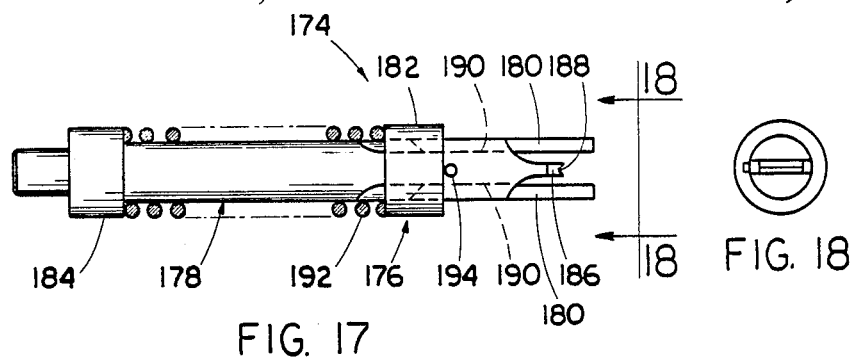
FIG. 17
FIG. 18
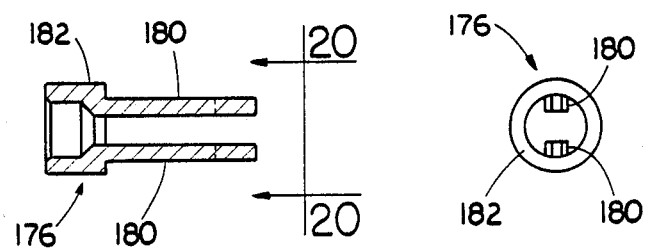
FIG. 19
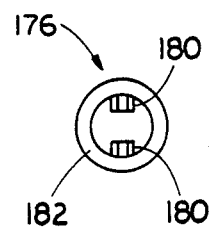
FIG. 20
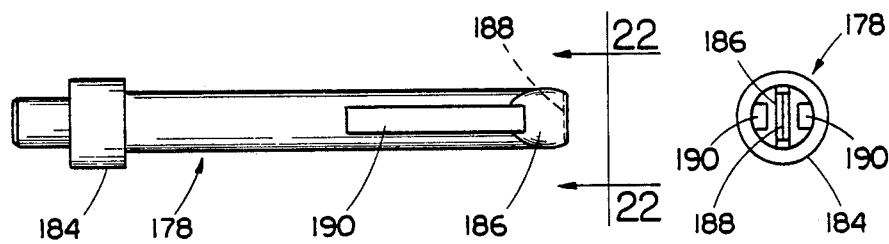
FIG. 21
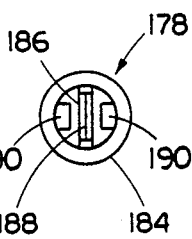
FIG. 22
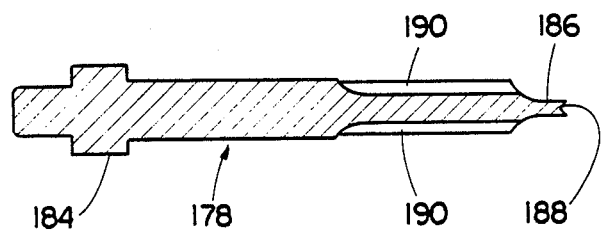
FIG. 23

TOOL FOR REPLACING LOCKING SCREWS IN A NUCLEAR FUEL ASSEMBLY

This application is a division of copending U.S. patent application Ser. No. 06/870584 filed June 4, 1986, now abandoned, which is a continuation-in-part of copending U.S. patent application Ser. No. 06/762,733 filed Aug. 5, 1985, now abandoned.

CROSS REFERENCE TO RELATED APPLICATION

Reference is hereby made to the following copending application dealing with related subject matter and assigned to the assignee of the present invention: "Nuclear Fuel Assembly Screw Capturing Device" by John M. Shallenberger et al, assigned U.S. Ser. No. 726,210 and filed Apr. 23, 1985.

BACKGROUND OF THE INVENTION

Field of the Invention

The present invention relates generally to fuel assemblies in nuclear reactors and, more particularly, is concerned with a method of removing failed locking screws, such as ones used to clamp the hold-down leaf springs of the top nozzle, and installing replacement locking screws.

Description of the Prior Art

Conventional designs of fuel assemblies include a multiplicity of fuel rods held in an organized array by grids spaced along the fuel assembly length. The grids are attached to a plurality of control rod guide thimbles. Top and bottom nozzles on opposite ends of the fuel assembly are secured to the control rod guide thimbles which extend above and below the opposite ends of the fuel rods. At the top end of the fuel assembly, the guide thimbles are attached in openings provided in the top nozzle. Conventional fuel assemblies also have employed a fuel assembly hold-down device having leaf springs which cooperate with the upper core support plate to prevent the force of the upward coolant flow from lifting the fuel assembly into damaging contact with the upper core plate of the reactor, while allowing for changes in fuel assembly length due to core induced thermal expansion and the like.

Heretofore, leaf springs of the aforementioned hold-down device have been fastened and held in their operative positions on the top nozzle by using several corner blocks and a number of screws which extend through the corner blocks and bases of the leaf springs and together with the corner blocks clamp the leaf springs at their respective bases to a peripheral top flange of the top nozzle. In their operative positions, the leaf springs extend in incline upward relationships along and within the outer perimeter of the top nozzle enclosure where they contact the upper core plate. Elongated metal locking pins have been used to retain the spring clamping screws in their tightened down condition. A locking pin is placed in one of the cross grooves on the screw head and the opposite ends of the pin which extend beyond the ends of the groove are welded to portions of the respective corner block adjacent the screw head.

Recently, some fuel assemblies employing the aforementioned hold-down device have been found to have broken leaf spring clamping screws. In at least one case, the broken screws allowed the corner block to shift laterally into the path of the control rod cluster control assembly (RCCA). The RCCA is centrally disposed within the central region of the fuel assembly bounded by the peripheral flange of the top nozzle and controls vertical movement of the control rods into and from the guide thimbles of the fuel assembly. Such inadvertent displacement of the corner block interference with control rod travel.

Evidence points strongly to the cause of the screw failures being stress corrosion cracking in reactor grade water of the high stressed Inconnel-600 material composing the clamping screws. These screw failures can pose serious consequences with respect to the reliability of fuel assemblies employing them and, therefore, as a precautionary measure, the removal of clamping screws of Inconnel-600 material from irradiated fuel assemblies and replacement with screws of different material are warranted.

Since replacement of the prior Inconnel-600 screws with new screws must be performed remotely with the fuel assembly submerged under water at a repair station, a need exists for a method of removing the prior screws with the locking pins welded to the corner blocks and installing new screws and locking the same in the corner blocks without welding the ends of the locking pins to the blocks.

SUMMARY OF THE INVENTION

The present invention provides a method of removing and replacing the prior screws with new screws wherein the welded ends of the pins locking the prior screws are sheared and the ends of the new pins used to lock the new screws do not need to be welded to the blocks. By simultaneously shearing the old welded pins as breakaway torque is applied to the prior screw to obtain release of its threads, the need to first cut and then remove the old welded pin is eliminated. This precludes the generation of metal chips which would be pariculary difficult to capture and remove from the fuel assembly. It should be noted that in shearing the welded pin at its opposite welded ends, no chips are produced, and the removed screw and subsequently installed replacement screw can easily be forced past the weld remnants that remain attached to the clamp block adjacent the counterbore which receives the screw. Also, in the method of the present invention the removal of old screws having their heads broken off can be readily accommodated. Finally, the new locking pins applied by the present invention to secure the new screws against loosening after being installed in the corner blocks are the ones comprising the invention illustrated and claimed in the patent application cross-referenced above.

Accordingly, the present invention is directed to a method of removing an old screw being fastened in a structure and replacing it with a new screw, comprising the steps of: (a) rotating the old screw with sufficient torque to unfasten a threaded shank thereof from a threaded bore defined in the structure and to shear a locking pin being disposed in a slot defined in a head of the old screw and rigidly connected to an annular wall in the structure which defines a counterbore within which is disposed the old screw head; (b) removing the unfastened old screw and sheared locking pin therewith from the structure to a discard location; (c) placing a threaded shank of a new screw into the threaded bore in the structure; (d) rotating the new screw with sufficient torque to fasten its threaded shank in the threaded bore of the structure; and (e) delivering against a curved locking pin diaposed in a slot defined in a head of the fastened new screw a force sufficient to cause straightening of the pin into the slot and outward extension and penetration of opposite pointed ends of the pin into the counterbore wall receiving the fastened new head such that the new screw is prevented from undergoing further rotation relative to the structure.

More particularly, the method further includes the steps of engaging the old screw head so as to facilitate rotation of the old screw and retention of the locking pin on the head thereof, and, then, as the old screw is rotated and its threaded shank unfastens from the threaded bore in the structure, gripping the head of the old screw with the sheared locking pin retained thereon in preparation for removing the old screw from the structure. Also, the method includes the steps of gripping the head of the new screw so as to facilitate its transport to the bore in the structure with the curved locking pin being aligned with the slot in the screw head aand its opposite pointed ends disposed in the slot so as to face outwardly toward the counterbore wall of the structure when the threaded shank of the new screw is threaded in the bore and the head is disposed in the counterbore.

In those instances where the head of the old screw is broken off so as to expose its threaded shank through the counterbore, the method of the present invention also includes the step of gripping the shank and rotating the same to effectuate removal of the remnant of the acrew of the structure.

Further, the steps of the method are remotely carried out by using a plurality of tools having a standard body with separate components for engaging the old and new screws being attachable to the body.

These and other advantages and attainments of the present invention will become apparent to those skilled in the art upon a reading of the following detailed description when taken in conjunction with the drawings wherein there is shown and described and illustrative embodiment of the invention.

BRIEF DESCRIPTION OF THE DRAWINGS

In the course of the following detailed description, reference will be made to the attached drawings in which:

FIG. 6 is an elevational view of the one of the tools for carrying out the steps of the method directed to removal of the old screw and replacement of the new screw in the top nozzle, with the tool partially sectioned and being illustrated in a foreshortened form.

FIG. 7 is an elevational view of the upper portion of the one of the tools for carrying out the step of the method directed to straightening of the curved locking pin disposed in the head of the new screw, with the tool upper portion partially sectioned and being illustrated in a foreshortened form.

FIG. 8 is an enlarged fragmentary view, in section, of the lower portion of FIG. 5, with the old screw being illustrated in elevational form fastened in the top nozzle and a fragmentary portion of the tool bit aligned above and approaching the screw head.

FIG. 9 is a sectional view taken along line 9—9 of FIG. 8.

FIG. 10A is an enlarged fragmentary top plan view as seen along line 10—10 of FIG. 9, showing the old screw head with its locking pin welded at opposite ends to the corner block.

FIG. 10B is a view similar to that of FIG. 10A, but showing the head of the old screw rotated sufficiently to cause the opposite ends of its locking pin to shear from the welds on the corner block.

FIG. 17 is an elevational view of a modified tool bit for carrying out the step of the method directed to the straightening of the curved locking pin disposed in the head of the new screw.

FIG. 18 is an end view of the modified tool bit as seen along line 18—18 of FIG. 17.

FIG. 19 is an elevational view of the indexing finger of the modified tool bit of FIG. 17.

FIG. 20 is an end view of the indexing finger as seen along line 20—20 of FIG. 19.

FIG. 21 is an elevational view of the impact body of the modified tool bit of FIG. 17.

FIG. 22 is an end view of the impact body as seen along line 22—22 of FIG. 21.

FIG. 23 is a cross-sectional view of the impact body taken along line 23—23 of FIG. 22.

DETAILED DESCRIPTION OF THE INVENTION

Figure 1:
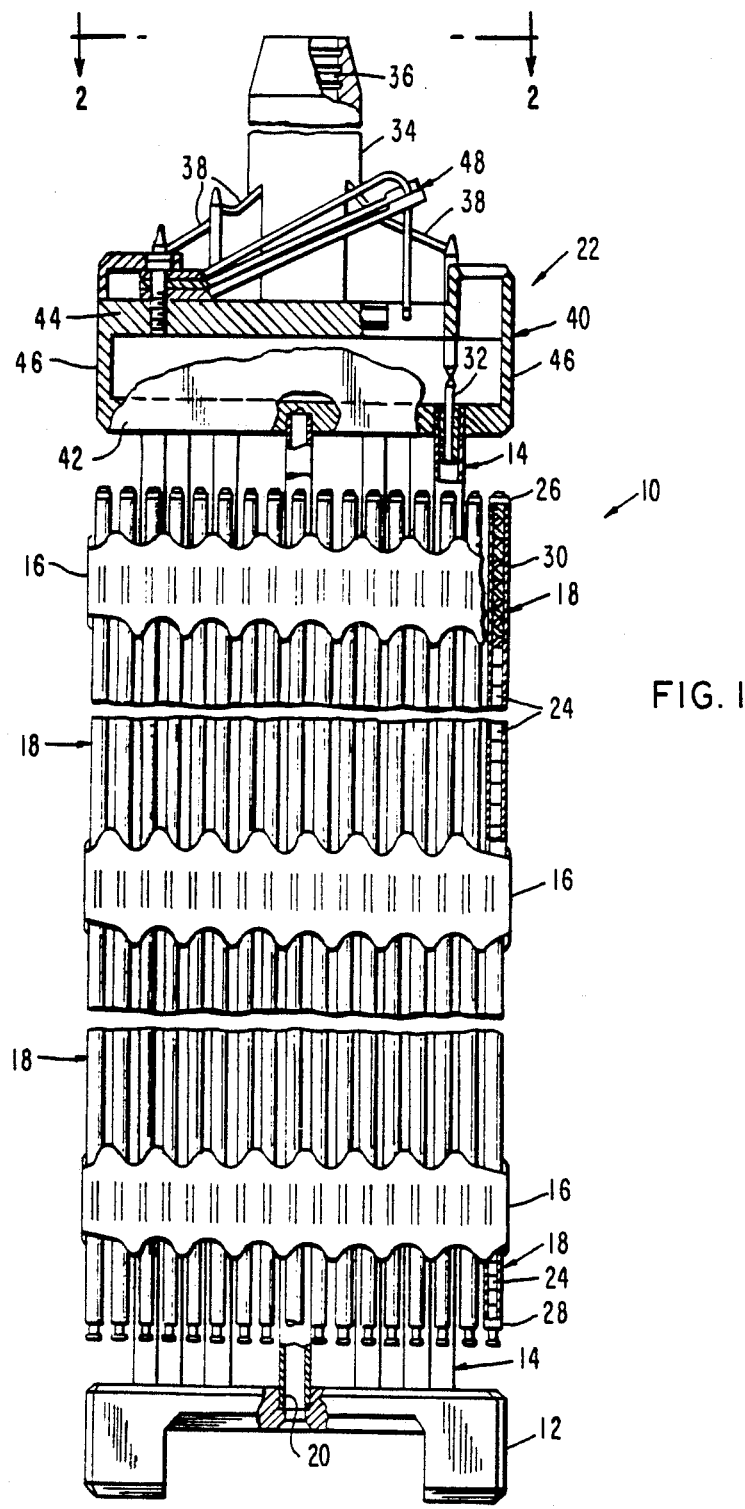
FIG. 1 is an elevational view, partly in section, of a fuel assembly from which old spring clamping screws can be removed and replaced with new ones by employing the method of the present invention, the fuel assembly being illustrated in vertically foreshortened form with parts broken away for clarity.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a fuel assembly, represented in vertical foreshortened form and being generally designated by the numeral 10. The fuel assembly 10 is the type used in a pressurized water reactor (PWR) and basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the upper ends of the guide thimbles 14. With such an arrangement of parts, the fuel assembly 10 forms an integral unit capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24, and the opposite ends of the rod are closed by upper and lower end plugs 26, 28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the PWR. A liquid moderator/coolant such as water, or water containing boron, is pumped upwardly through the fuel assemblies of the core in order to extract heat generated therein for the production of useful work.

To control the fission process, a number of control rods 32 are reciprocally movable in the guide thimbles 14 located at predetermined positions in the fuel assembly 10. Specifically, associated wih the top nozzle 22 of the assembly 10 is a rod cluster control mechanism 34 having an internally threaded cylindrical member 36 with a plurality of radially extending flukes or arms 38. Each arm 38 is interconnected to a control rod 32 such that the control mechanism 34 is operable to move the control rods 32 vertically in the guide thimble 14 to thereby control the fission process in the fuel assembly 10, all in a well known manner.

Leaf Springs with Clamping Screws

Figure 2:
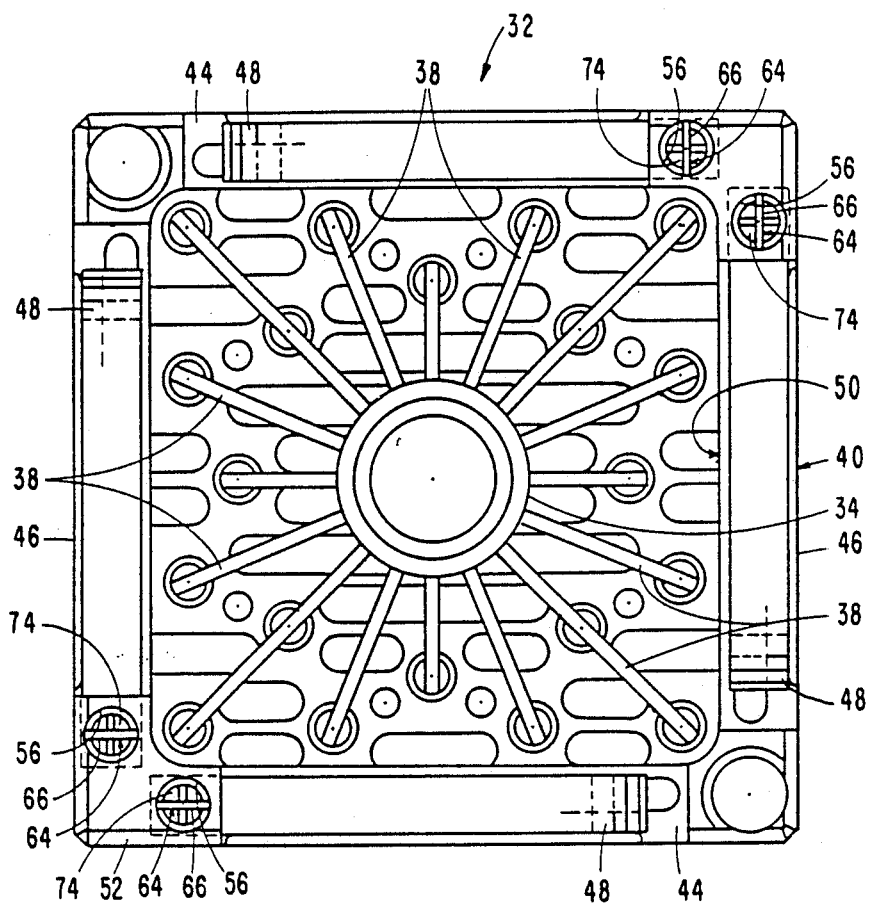
FIG. 2 is an enlarged top plan view of the fuel assembly as seen along line 2—2 of FIG. 1, showing the top nozzle having the old screws removed and the new screws with the non-welded locking pins installed in the corner blocks so as to clamp the leaf springs on the top nozzle.

Referring to FIG. 2 as well as to FIG. 1, it is seen that the top nozzle 22 includes an enclosure or housing 40 formed by a transversely extending lower adapter plate 42 and an upper annular flange 44 with an upstanding sidewall 46 extending between and integrally interconnecting the adapter plate and flange at their respective peripheries. Suitably clamped to the annular flange 44, by components installed in accordance with the method of the present invention to be described below, are a plurality of sets of leaf springs 48 which constitute the hold-down device of the fuel assembly. The leaf springs 48 cooperate with the upper core plate (not shown) in a conventional manner to prevent hydraulic lifting of the fuel assembly 10 caused by upward coolant flow while allowing for changes in fuel assembly length due to core induced thermal expansion and the like. Also, the rod cluster control assembly 34 is disposed within a central top opening 50 of the top nozzle 22 defined by the annular flange 44.

As seen in FIGS. 1 and 2, each set of leaf springs 48 is fastened and held in their operative position on the top nozzle upper flange 44 by using a corner block 52 and a spring clamping screw 54 which extends through a counterbore 56 defined in the corner block and a pair of aligned holes 58 defined in the bases 60 of the set of leaf springs, and is threaded into a bore 62 of the upper annular flange 44. Together with the corner blocks 52, when the screw 54 is tightened down it clamps the leaf springs 48 of the one set at their respective bases 60 to the peripheral upper annular flange 44 of the top nozzle 22. In their operative positions, the leaf springs 48 extend in inclined upward relationship along and within the outer perimeter of the top nozzle housing 40 where they contact the upper core plate.

Figure 14:
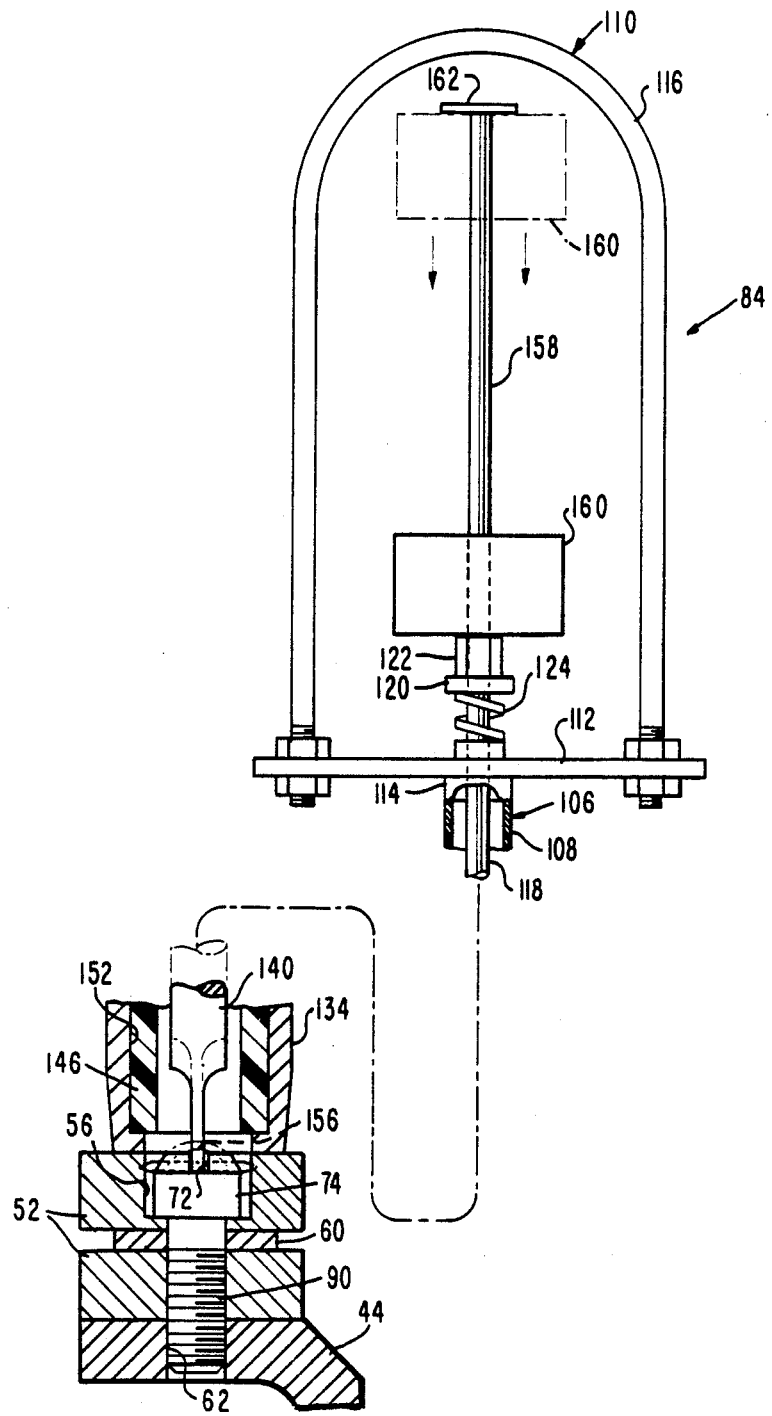
FIG. 14 is an elevational view of one of the tools for carrying out the step of the method directed to straightening of the curved locking pin disposed in the head of the new screw, with the tool partially sectioned and being illustrated in a foreshortened form, the new screw being shown in elevational form and the structure of the top nozzle in sectional form.

Each of the screws 54 which clamps one of the sets of leaf springs 48 to the top nozzle 22 has associated with it a screw capturing device, being designated by the numeral 64. The capturing device 64, comprising the invention illustrated and claimed in the patent application cross-referenced above and the disclosure of which is incorporated herein by reference, takes the form of an elongated metal locking pin 66 having a bent, arcuate or curved longitudinal shape and a generally cylindrical cross-sectional shape. The locking pin 66 has a hardened metal tip 68 affixed, such as by welding, to each opposite end of the pin and ground to a sharp conical point 70. Each pin 66 is received within one of the slots 72 orthogonally defined in the head 74 of the screw 54. In view of its curved shape, the effective length of the pin 66, including the tips 68 thereof, is confined within the diameter of the screw head 74 (or the length of the one screw head slot 72), as seen in FIG. 14 to permit installation of the screw 54 with the pin 66 carried on it. Then, when the pin 66 is subsequently straightened to the condition shown also in FIG. 14, the tip-to-tip dimension is longer than the length of the slot 72 as well as the diameter of the counterbore 56 in which the screw head 74 is disposed. As a result, the hardened tip points 70 penetrate into the softer metal of the wall 76 defining the counterbore 56 in the corner block 52 as represented generally in FIG. 2 and in more detail in FIG. 14.

Method of Removing and Replacing Clamping Screws

Figure 3:
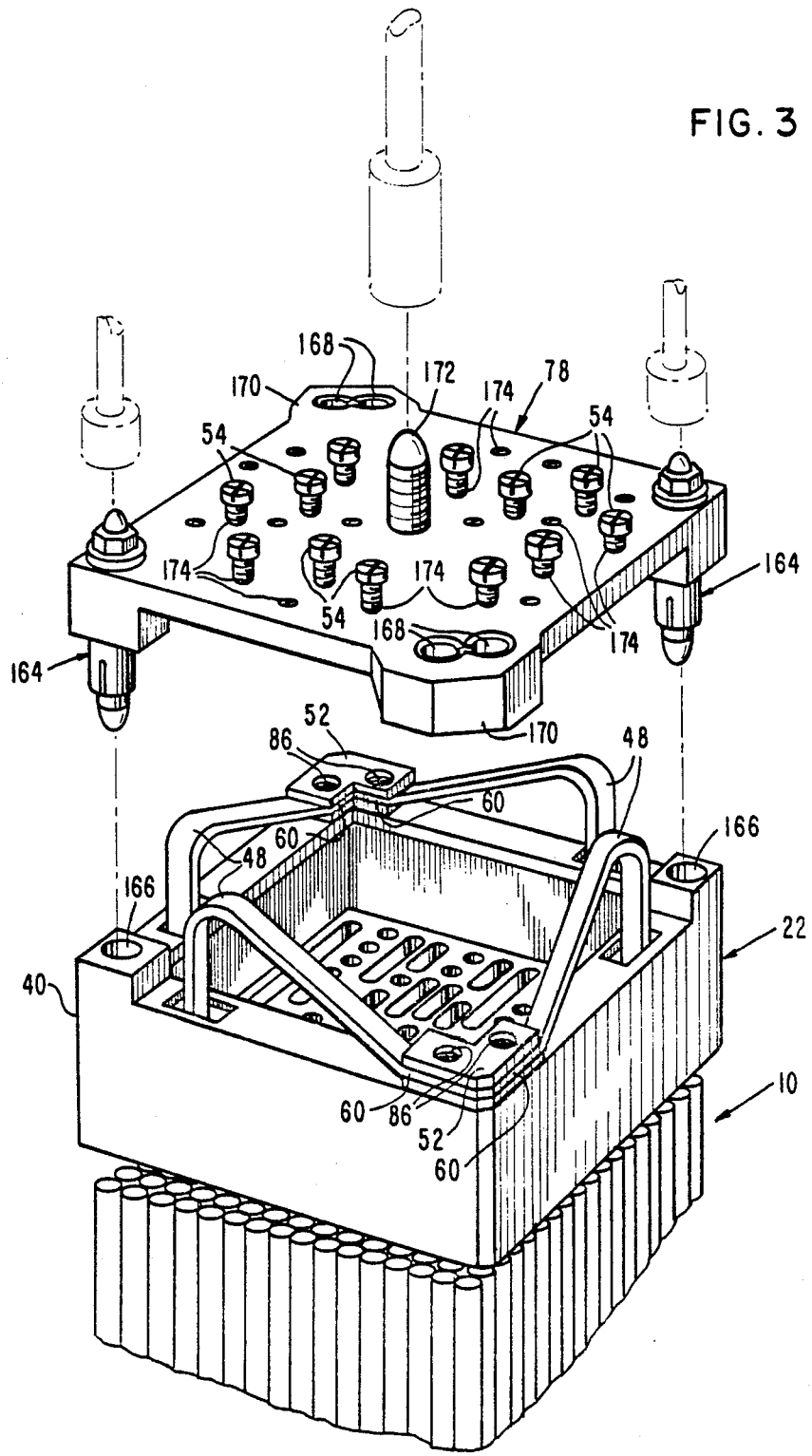
FIG. 3 is an exploded perspective view of a fixture which is used in carrying out the screw removal and replacement method of the present invention being aligned above the top nozzle of the fuel assembly.
Figure 4:
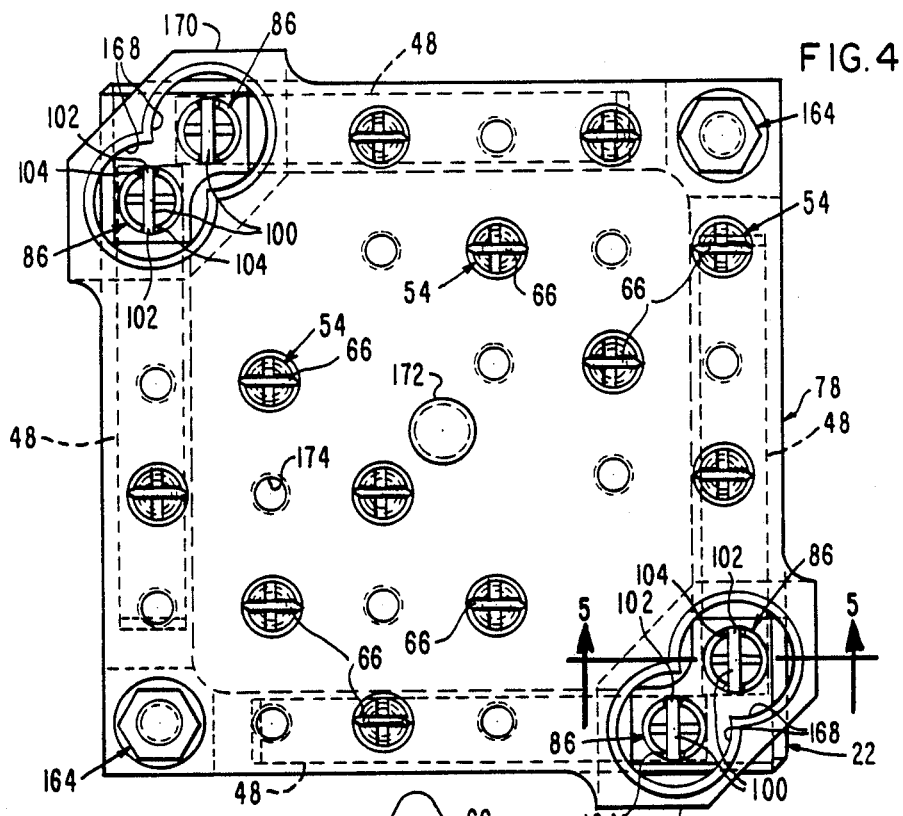
FIG. 4 is a top plan view of the fixture of FIG. 3 attached on the top nozzle in operative position for carrying out the method of the present invention, old screws having locking pins welded to the top nozzle being seen through the corner through-holes of the fixture and new replacement screws with curved locking pins being seen in upright positions of the fixture.
Figure 5:
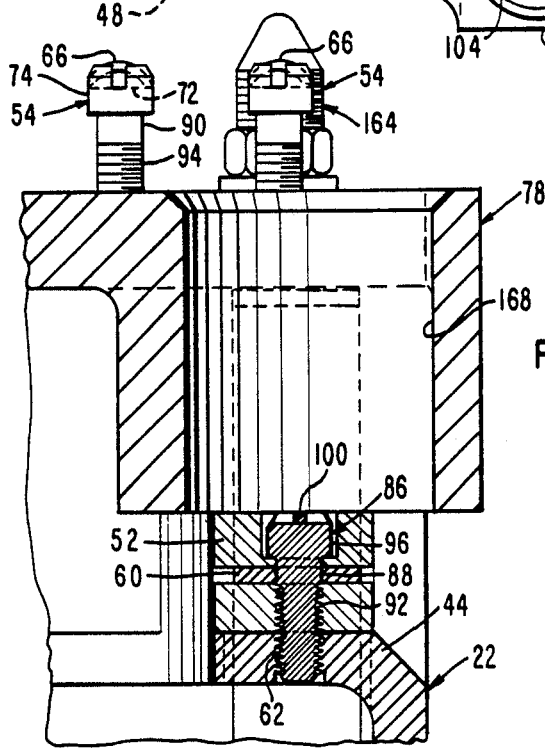
FIG. 5 is an enlarged fragmentary sectional view taken along line 5—5 of FIG. 4 across one corner of the fixture and top nozzle.

Turning now to FIGS. 3 to 14, there is illustrated a fixture 78 and various tools 80,82,84 for carrying out the steps of the method comprising the present invention, that being the method of remotely removing each of the old screws 86 clamping each set of the top nozzle hold-down springs 48, as seen in FIG. 4, and replacing them with the above-described new screws 54, as seen in FIG. 2. While the steps of the method are illustrated in conjunction with the removing and replacing screws which clamp sets of hold-down leaf springs, it should be understood that the method could just as readily be applied to removal and replacement of screws which fasten other components of the fuel assembly 10.

Each of the screws 54,86 are identical in configuration, differing only in the material from which each is fabricated. Although the old and new screws are structurally the same, different numerals 54,86 have been used to distinguish between the two in order to know which one is involved in each particular step of the method which will be described shortly. Likewise, the same structural parts of the screws to be next described will be identified with different numerals.

Each of old screw 86 (see FIGS. 8, 10A, 11 and 12) and new screw 54 (see FIG. 14) has a shank 88,90 with threads 92,94 thereon. The old screw 86 has a head 96 on its threaded shank 88 with a pair of orthogonal slots 98 defined therein which extends diametrically across the head and are open at their opposite ends. Similarily, the head 74 of the new screw 54 is attached on its threaded shank 90. Like the new screw 54, the old screw 86 has an elongated metal locking pin 100 associated with it which is used to retain it in a tightened down condition. However, in contrast to the way in which the new curved pin 66 is installed in the new screw 54 and interfaced with the top nozzle counterbore wall 76, as seen in FIGS. 8, 9 and 10A, the old locking pin 100 is placed in one of the cross slots 98 in the old screw head 96 and the opposite ends 102 of the old pin which extend beyond the ends of the slots 98 are welded, at 104, to portions of the corner block counterbore wall 76 adjacent the old screw head 96. The only welding involved in the new pin 66 is in fabrication of the welded tips 68 on the pin. There is no welding to secure the new pin 66 for locking the new clamping screw 54 to the counterbore wall 76.

As mentioned above, the steps of the method are remotely carried out by using the fixture 78 and tools 80, 82, 84. Each of the tools 80, 82, 84 is thirty feet or longer in length and has a standard body, generally designated 106, with separate components attachable to the body for use in carrying out separate steps of the method. The standard body 106 has an elongated outer tubular housing 108 and a bail assembly 110 attached thereto. The bail assembly 110 is formed of a generally flat plate 112 disposed in transverse relationship to the axial extent of the outer tubular housing 108 and centrally attached, such as by welding, to the upper end 114 thereof and of a bail or handle loop 116 connected to opposite peripheral portions of the plate 112 and extending upwardly therefrom.

The standard body 106 further includes an inner torque rod assembly 118 disposed in the outer tubular housing 108 for axial movement therealong. The rod assembly 118 is capable of transmitting high torque and a knob 120 is attached to the upper end of assembly 118 and adapted to be turned by an operator to align the component on the opposite end of the assembly 118 with the appropriate slot 72, 98 in the head 74, 96 of the respective new or old screw 54, 86 in order to thread or unthread it. Also, a hex head 122 connected on the knob 120 is utilized to attach a torque wrench (not shown) to the assembly 118. The torque wrench is used to apply high torque required to unfasten the old screw 86 and at the same time shear the welded ends 102 of the old pin 100. Also, the wrench is used to exert the specified preload torque on the new replacement screws 54 after they have been threaded "finger tight" in the bore 62. A spring 124 between the knob 120 and flat plate 112 reduces the lifting force and a removable pin 126 is provided to keep the torque rod assembly 118 in a raised position when the tool is transporting a screw.

At an opposite lower end 128 of the outer tubular housing 108 of the standard tool body 106 is attached one of several different tool heads 130, 132, 134 which each accommodate one of several different tool bis 136,138,140. Disposed concentrically within the central bores 142,144 in each of the tool heads 130,132 are polyurethane retainer sleeves 146,148. The retainer sleeve 146 of FIGS. 6 and 11 to 14 has an inside diameter sized to form an interference fit for gripping the heads 96,74 of respective old and new screws 86,54, whereas the retainer sleeve 148 of FIGS. 15 and 16 has an inside diameter sized to form an interference fit for gripping the threaded shank 88 of an old screw 96 whose head 96 has broken off.

Figure 11:
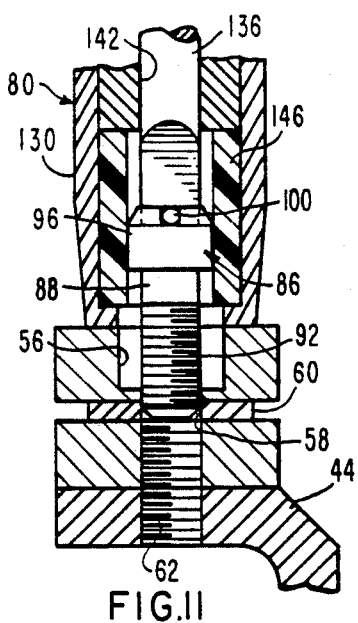
FIG. 11 is a view similar to that of FIG. 8, but showing the old screw unfastened from the top nozzle bore with the head of the screw gripped in the retainer sleeve of the tool of FIG. 6.

As seen in FIG. 11, the sleeve 146 in the tool 80 receives the old screw head 96 as the old screw 86 is unfastened from the top nozzle bore 62 via torque transmitted thereto through the tool bit 130 in the form of a special screw driver attached to the lower end of the torque rod assembly 118. The torque is produced by manual rotation of the knob 120 in the appropriate direction. As the old screw 86 is rotated, its head 96 rises into the sleeve 146 in the central bore 142 of the tool head 130. The screw driver tool bit 130 and retainer sleeve 146 of the tool 80 are also used to rotate the new screw 54 and rceive and grip the head 74 thereof, as seen in dashed line form in FIG. 13. While the old screw 86 gripped by the sleeve 146 will be transported from the top nozzle bore 62 to a disposal location, the new screw 54 will be transported from the fixture 78 to the top nozzle bore 62. The old screw 86 is removed from the sleeve 146 by removal of the pin 126 in the assembly 118 and then by pushing downward on the top knob 120 so as to force the screw out of the retainer sleeve and from the tool head bore 142.

The new replacement screws 54, as seen in FIG. 3, extend upright from tapped holes 174 in the guide fixture 78. They are engaged and gripped by the sleeve 146 of the tool head 130 of the tool 80 by lowering the tool head over the new screw head 74 with the torque rod assembly 118 in the raised and pinned position, as seen in FIG. 6. In this position, the screw drive tool bit 136 is kept out of contact with the new screw 54. As the tool head 130 is guided over the new screw head 74, the tool weight is used to force the retainer sleeve 146 over the head and capture and grip the screw. The raised torque rod assembly 118 is then unpinned, lowered such that screw driver bit 136 contacts the screw head 74 at which point the top knob 120 is rotated until the bit 136 enters the screw head slot 72. The tool is then properly engaged to the screw 54 for threading into the threaded bore 62 of the top nozzle 22. Note that an arcuate notch 154 in the tool bit 136 accommodates the old and new locking pins 100,66.

Figure 15:
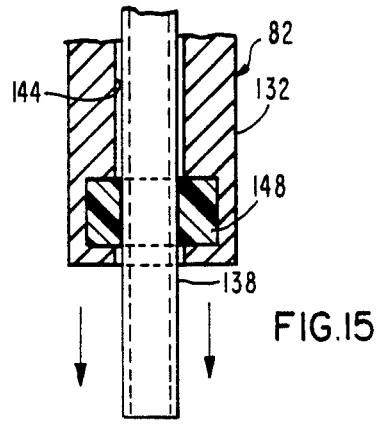
FIG. 15 is a fragmentary elevational view, partly in section, of the tool head and bit of the one of the tools for carrying out the steps of the method directed to removing an old screw having a broken off head.
Figure 16:
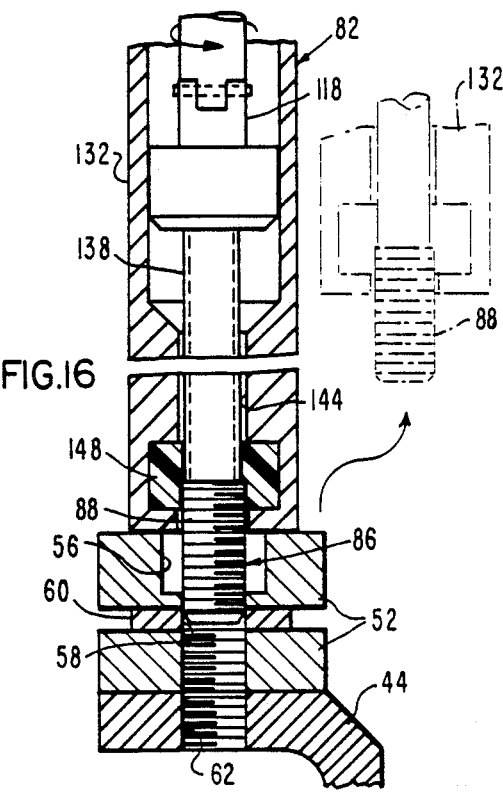
FIG. 16 is a view similar to that of FIG. 15, but showing more of the tool and illustrating the shank of the broken screw unfastened from the top nozzle bore and being gripped by the retainer sleeve of the tool.

As seen in FIGS. 15 and 16, the bit 138 of the tool 82 is used to remove an old screw 86 with a broken head 96. The broken head tool bit 138, which is received through the central bore 144 of the tool head 132 and the retainer sleeve 148 disposed therein and attached to the lower end of the torque rod assembly 118, is a high strength thin wall tube with an outside diameter slightly less than the diameters of the holes 58 in the spring bases 60 and of the threaded bore 62 in the top nozzle flange 44. Further, the inside diameter of the tool bit tube 138 is slightly less than the diameter of the old screw shank 88 above the threads 92 thereon. Should the screw fail in the threaded section rather than at the intersection with the head 96, it will break at the root (minor diameter) in which case the inside diameter of the tool bit tube 138 which is greater than the screw thread diameter will bear against the broken screw. Therefore, regardless of whether the screw breaks at the head or at a thread minor diameter, the bearing end 150 of the tool bit tube 138 coupled with the weight of the tool against this bearing end creates sufficient frictional drag to cause the broken screw to be easily unthreaded from the bore 62 by simply turning the knob 120 at the upper end of the torque rod assembly 118 in the appropriate direction.

As the broken screw threaded shank 88 is unfastened from the bore 62 it rises into frictional engagement with the retainer sleeve 148. Once the sleeve 148 firmly grips the broken screw 86, the outer tubular housing 108 of the body 106 can be turned to disengage the remaining threads ad the screw remnant removed and transported to a disposal location, such as a disposal canister (not shown). At the disposal point, the broken screw is extracted from the retainer sleeve 148 in the tool head 132 by pushing the inner rod assembly 118 downward.

The tool 84, seen in FIGS. 7 and 14, is used to straighten the pin 66. Its head 134 on the lower end 128 of the outer tubular housing 108 of its standard tool body 106 has the pin setting tool bit 140 disposed in the central bore 152 and connected to the lower end of the torque rod assembly 118. The tool bit 140 indexes into the slot 72 in the new screw head 74 at right angles to the other slot 72 with the curved pin 66. A "saddled" groove 156 in the tool bit 140 bears against the central portion of the curved pin 66. The knob 120 is turned until the groove 156 rests against the central portion of the pin.

In this case, an additional component is provided on the tool 84 in the form of a guide rod 158 threaded into the top of the knob 120 an extends above it. Further, a cylindrical impact weight 160, for example weighting twelve pounds, is reciprocally mounted on the guide rod 158. The impact weight 160 is raised against an upper stop 162 on rod 158 and released. When the falling weight 160 strikes the knob 120, the impact force travels down the inner rod assembly 118 to the end of the tool bit 14 in contact with the curved pin 66, as seen in FIG. 14, where it straightens the pin, driving its hardened pointed tips 68 into the counterbore wall 76 of the block 52. The impact weight/drop distance is calibrated to provide reliable and repeatable proper setting of the pin 66.

Finally, the guide fixture 78 seen in FIG. 3 locks to the top nozzle 22 by means of two split sleeve/wedge pin assemblies 164 in diagonally opposite corners of the fixture which engage in corresponding corner holes 166 in the top nozzle 22. Large chamfer double through-holes 168 in each of the other two corners of the fixture 78 are precisely aligned over the clamping screws 54, 86 in the top nozzle. The pads 170 containing the through-holes 168 providing access to the screws also bear against the spring clamp blocks 52 and thus prevent movement of the hold-down spring bases 60 when a screw 86 is removed. A center threaded shaft 172 provides an engagement means for a long-handled tool (not shown) used to install and remove the fixture 78. Also, included in the fixture is an array of tapped holes 174 to support the new replacement screws 54 which will be installed after removal of the old screws 86. Ends of the long-handled tool for actuating the assemblies 164 and shaft 172 are shown in phantom in FIG. 3.

A modified pin setting tool bit 174 for use in straightening the pin 66 is seen in FIG. 17–23. The modified tool bit 174 can be incorporated into the tool 84 in place of the tool bit 140, being attached to the lower end of the torque rod assembly 118. The modified tool bit 174 includes an indexing finger 176 and an impact body 178. The impact body 178 is attached to the torque rod assembly 118, whereas the indexing finger 176 is movable along the impact body 178. More particularly, the indexing finger 176 has two laterally spaced fingers 180 fixed to a hollow ring 182. The impact body 178 is a generally cylindrical rod having an annular flange 184 at its inner end and a tapered outer end 186 with a concave impact surface 188 adapted to interfit with the arched pin 66. Two grooves 190 are formed on opposite sides of the impact body 178 and displaced ninety degrees from the plane of the outer end 186 of the body 178. The grooves 190 receive the fingers 180 of the indexing finger 176 with the indexing finger ring 182 inserted on the impact body 178. A compression spring 192 encircles the impact body 178 between the inner flange 184 of the body and the ring 182 on the indexing finger 180. Thus, the indexing finger 176 travels along the impact body 178 in a fixed orientation. As seen in FIG. 17, a dowel pin 194 in the impact body 178 is abutted by the ring 182 so as to limit the outward extension of the indexing finger 180 on the impact body and the displacement of the ends of the fingers 180 past the body end 186.

When the modified tool bit 174 is lowered through the head 134 of the tool 84, the two fingers 180 of the indexing finger 176 are brought into contact with the screw head 74 and then rotated until the fingers drop into the two empty slots in the screw head at right angles to the arched pin 66. The tool cannot be turned further when the two fingers 180 have entered the slots thus signalling the operator that the tool is in the proper position for pin straightening. In this position the concave surface 188 at the end 186 of the impact body 178, being displaced above the ends of fingers 180, is precisely aligned with the arched pin so that upon applying the impact force, the pin is straightened, driving the hardened, pointed tips 68 into the walls of the counterbore wall 76. The impact force is delivered to the arched pin 66 by raising the impact weight 160 against the upper stop and then releasing the weight. When the falling weight 160 strikes the knob 120, the impact force travels down the solid rod 118 to the impact body 178 which is in contact with the arched pin 66.

To summarize, the tool 80 is used for engaging, rotating, gripping and removing the old screw 86 from the top nozzle 22 to a discard location. The tool 80 is also used for gripping, transporting and rotating the new screw 54 to fasten it into the top nozzle 22 for clamping the leaf springs 48. The tool 82 is used for gripping, rotating and removing the threaded shank 88 of an old screw 86 having a broken head 96. The tool 84 is used for delivering the force against the curved pin 66 disposed on the head 74 of the new screw 54 which is necessary to straighten the pin 66 and secure the new screw against rotation. The fixture 78 is used to retain the leaf springs 48 in operative position while the screws are being changed and to provide a storage area for the replacement screws 54.

The steps of the screw removal and replacement method of the present invention which will be described now are best illustrated in FIGS. 8, 9 and 11 to 15.

In FIGS. 8 and 9, by using tool 80, the head 96 of the fastened old screw 86 is engaged by the bit 136 so as to facilitate rotation of the screw and retention in the slot 98 in the screw head 96 of the locking pin 100 which is rigidly connected at its opposite ends 102 by welds 104 to the counterbore wall 76 of the top nozzle flange 44, as seen in FIG. 10A.

Then, the old screw 54 is rotated with sufficient torque transmitted thereto via the rod assembly 118 and bit 136 to unfasten its threaded shank 88 from the threaded bore 62 in the top nozzle 22 and to shear the locking pin 100 adjacent its rigidly connected opposite ends 102, as seen in FIG. 10B.

Figure 12:
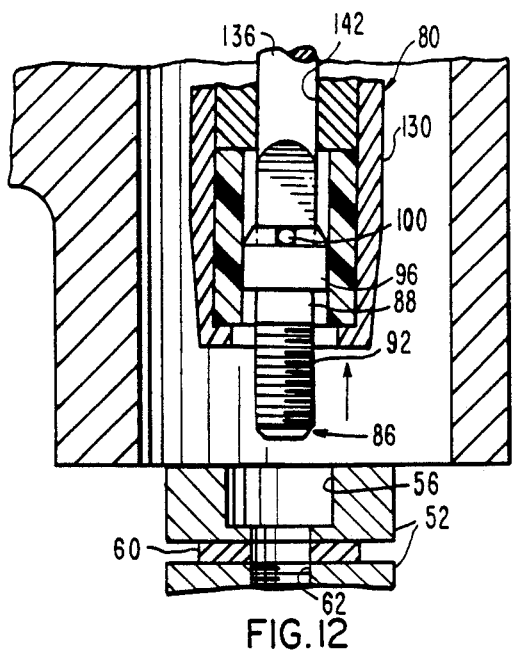
FIG. 12 is a view similar to that of FIG. 11, but showing the old screw gripped within the retainer sleeve of the tool of FIG. 6 and being removed from the top nozzle upwardly through one of the enlarged corner through-holes of the fixture of FIG. 3.

As the old screw 86 is rotated and its threaded shank 88 unfastens from the threaded bore 62 of the top nozzle 22, the screw 86 moves axially upward from its fastened position of FIG. 8 to its unfastened position of FIG. 11. Concurrently, as depicted in FIG. 11, the head 96 of the old screw 86 with the sheared locking pin 100 retained in the slot 98 is gripped about its perifery by the retainer sleeve 146. This allows the old screw 86 to be lifted when free of the threaded bore 62 for removal from the top nozzle 22, as shown in FIG. 12. The unfastened old screw 86 and shear locking pin 100 therewith are removed from the top nozzle 22 to a discard location.

Figure 13:
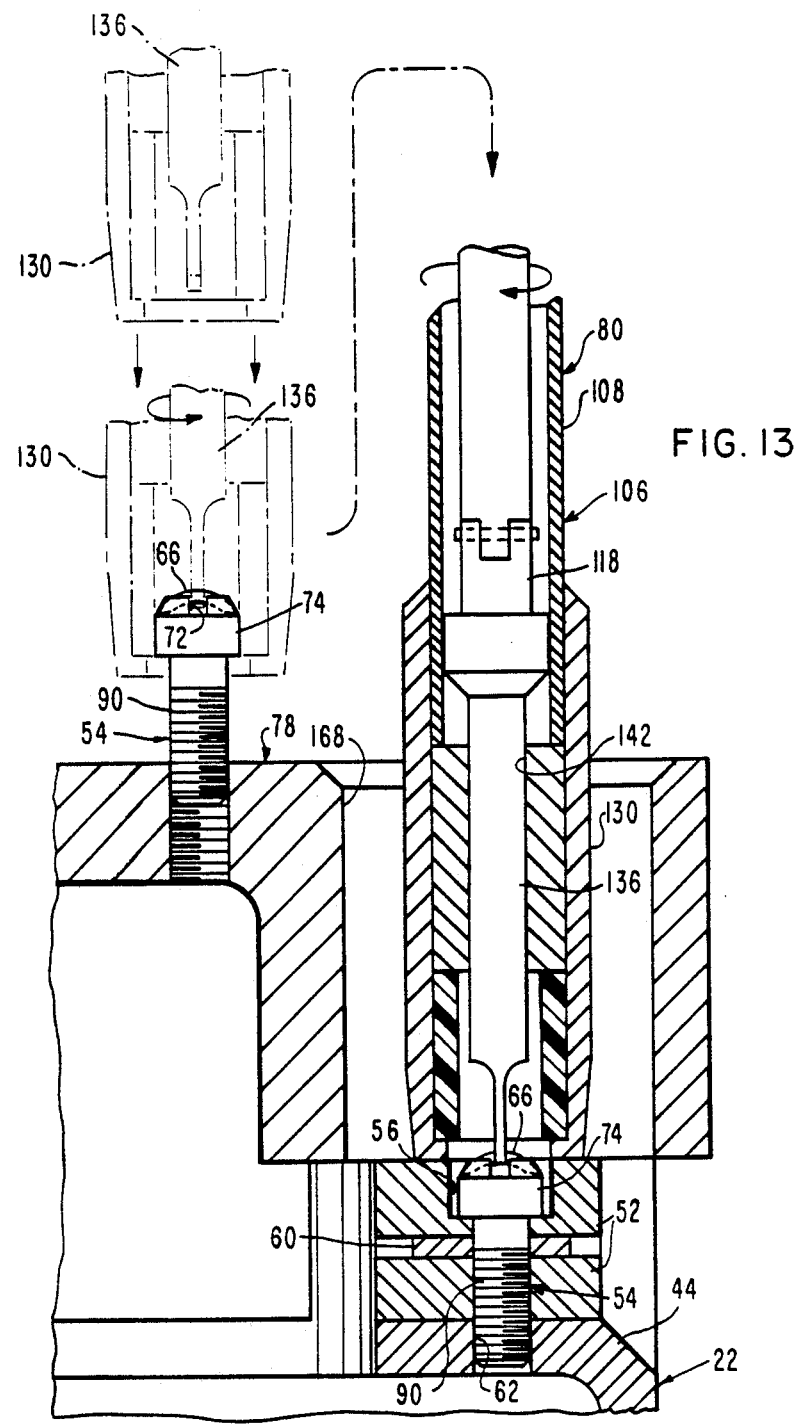
FIG. 13 is a view similar to that of FIG. 12, but showing more of the fixture and top nozzle in order to depict several sequential steps of the method carried out by the tool of FIG. 6 in transporting a new screw from the fixture and threading it in the bore in the top nozzle.

Then, the head 74 of a new screw 54 is gripped, as depicted in dashed line form in FIG. 13, by the retainer sleeve 146 of the tool 80 so as to facilitate transport of the screw 54 to the top nozzle bore 62. The new screw 54 has the curved locking pin 66 on its head 74 with the opposite pointed tips 68 of the pin 66 disposed in the slot 72. The tips 68 face outwardly toward the annular wall 76 of the counterbore 56 when the threaded shank 90 of the new screw 54 is threaded in the bore 62 and the head 74 is disposed in the counterbore 56, as seen in solid line form in FIG. 12. The threading is achieved by rotation of the new screw 54 with sufficient torque by the tool 80 so as to fasten its threaded shank 9 into the threaded bore 62 of the top nozzle 22.

Finally, with the new screw 54 fastened in the top nozzle bore 62, as shown in FIG. 14 a force is delivered by the weight 160 of the tool 84 via its assembly 118 and bit 140 (or bit 174) against the curved locking pin 66 disposed in the slot 72 of the head 74 of the fastened new screw 54. The force is of a magnitude sufficient to cause straightening of the pin 66 into the slot 72 and outward extension and penetration of the pointed tips 68 of the pin 66 into the wall 76 defining the counterbore 56 which receives the screw head 74. The penetration of the wall 76 by the pin tips 68 prevents the new screw 54 from undergoing further rotation relative to the top nozzle 22.

In those instances where either the old screw 86 has its head 96 broken off (as seen in phantom in FIG. 15) or it breaks off when trying to unfasten it and its threaded shank 88 is then exposed, by using the tool 82 several alternative steps are carried out. First, the threaded shank 88 of the old screw 86 is gripped by the hollow bit 138 and, then, it is rotated with sufficient torque to effectuate unfastening thereof from the threaded bore 62 defined in the top nozzle 22. The threaded shank 88 is then gripped by the retainer sleeve 148 of the tool 82 as shown in FIG. 16, and as before, is then removed from the top nozzle 22 to a discard location.

It is thought that the method of the present invention and many of its attendant advantages will be understood from the foregoing description and it will be apparent that various changes may be made in the steps thereof without departing from the spirit and scope of the invention or sacrificing all of its material advantages, the form hereinbefore described being merely a preferred or exemplary embodiment thereof.

We claim:

1. A tool for straightening an arched pin into one of a pair of slots orthogonally defined in a screw head, comprising:
    (a) an elongated positioning and forcetransmitting rod-like member;
    (b) means mounted on one end of said rod-like member for applying an axially directed force to said member;
    (c) an elongated sleeve mounting said rod-like member for reciprocal movement within said sleeve and having an end adapted to seat about said screw head;
    (d) a tool handle mounted at one end of said sleeve adjacent said force-applying means on said one end of said rod-like member; and
    (e) a pin setting tool bit connected to an opposite end of said rod-like member being indexible with one of said slots in said screw head and for delivering said impact force to said arched pin in said other screw head slot.

2. The tool as recited in claim 1, wherein said tool bit includes:
    an impact member connected to said opposite end of said rod-like member and having an impact delivering end surface;
    an indexing member axially movably mounted to said impact member; and
    resilient means biasing said indexing member to extend at one end past said end surface of said impact member to engage said one slot of said screw head, said resilient means being yieldable to allow relative movement between said indexing member and said impact member which permits said impact member to deliver said impact force to said arched pin as said indexing member is maintained in engagement with said one slot.

3. The tool as recited in claim 2, wherein:
    said impact member has one stop element disposed at an end of said member opposite said end surface thereof and a pair of guide grooves defined along opposite sides of said member; and
    said indexing member has a mounting ring disposed about and axially movable along said impact member and a pair of axially extending and laterally spaced apart fingers attached at one end thereof to said ring and disposed within said guide grooves of said impact body.

4. The tool as recited in claim 3, wherein:
    said impact body has another stop element thereon disposed adjacent said guide grooves and spaced from said one stop element for limiting the extension of ends of said indexing fingers past said end surface of said impact member.

5. The tool as recited in claim 4, wherein:
    said resilient means is a compression spring disposed about said impact member and extending between said one stop element thereon and said ring of said indexing member.

* * * * *